United States Patent [19]
Koo et al.

[11] Patent Number: 5,676,148
[45] Date of Patent: *Oct. 14, 1997

[54] METHOD AND SYSTEM FOR DOPPLER ULTRASOUND AUDIO DEALIASING

[75] Inventors: Ja-il Koo, Issaquah; Scott D. Otterson, Seattle, both of Wash.

[73] Assignee: Siemens Medical Systems Inc., Iselin, N.J.

[*] Notice: The term of this patent shall not extend beyond the expiration date of Pat. No. 5,553,621.

[21] Appl. No.: 710,057

[22] Filed: Sep. 10, 1996

Related U.S. Application Data

[63] Continuation-in-part of Ser. No. 414,979, Mar. 31, 1995, Pat. No. 5,553,621.

[51] Int. Cl.$^6$ ................................................. A61B 8/00
[52] U.S. Cl. ........................................................ 128/661.01

[58] Field of Search ................. 128/660.04, 660.05, 128/660.07, 661.08, 661.09, 661.11, 662.02; 73/861.25

[56] References Cited

U.S. PATENT DOCUMENTS

| 5,515,852 | 5/1996 | Karp et al. | 128/660.07 |
| 5,544,128 | 8/1996 | Kim et al. | 128/661.01 |

*Primary Examiner*—George Manuel

[57] ABSTRACT

A Doppler audio dealiasing system has a zero inserter that inserts zeros between input samples of signal. The resultant signal is then processed in various ways. After the zeros are inserted and a new signal is formed, the newly formed signal is filtered with or without a modulator and otherwise processed to remove inappropriate parts to generate forward and reverse audio signals corresponding to the adjuster.

10 Claims, 12 Drawing Sheets

5,676,148

1

METHOD AND SYSTEM FOR DOPPLER ULTRASOUND AUDIO DEALIASING

CROSS-REFERENCE TO RELATED APPLICATIONS

This application is a continuation-in-part of U.S. patent application Ser. No. 08/414,979, filed 31 Mar. 1995, now U.S. Pat. No. 5,553,621.

BACKGROUND OF THE INVENTION

1. Field of the Invention

This invention relates to Doppler ultrasound medical systems and more particularly to the dealiasing of Doppler audio output signals for improved sound quality in the audio output of the sampled data and producing stereo Doppler audio corresponding to spectral adjustment of a spectral display.

2. Description of the Related Art

In the medical industry, ultrasound systems have gained popularity for medical diagnosis because they are non-invasive and are capable of providing a detailed and accurate imaging of components of the body. Real-time Doppler ultrasound systems am used to image motion such as blood flow through arteries or the heart.

The Doppler effect is a physical phenomenon present when the source of a wave or signal and an observer move relative to one another. The frequency, or, inversely, the wavelength, of the signal increases or decreases, respectively, depending upon the direction of motion of the source or observer.

"Aliasing" is also a known phenomenon that often arises when a continuous signal is processed in a discrete form, for example, as a series of values obtained by sampling the continuous signal at set time intervals, or by processing the continuous signal as a sequence of separate time "slices." In both cases, given the frequency f with which the continuous signal is sampled (either as discrete values or as time blocks), then components of the signal's spectrum with frequencies greater than 2-f will appear to lie at different places on the spectrum than they actually are. These components typically appear to have been "wrapped around" the y-axis and appear in the negative-frequency half of the spectrum, or they appear to have been shifted upward in frequency, or both. In other words, these components appear to have "aliases," that is, to lie where they are not.

The phenomenon of aliasing can be illustrated by shining a stroboscope onto a fan whose blades rotate in a clockwise (or positive) direction, If the stroboscope frequency is fast enough, then the fan blades will appear to rotate clockwise, as they in fact do. As the stroboscope's frequency is lowered, however, the fan blades will eventually appear to be "frozen" in place. If one lowers the strobe frequency still further, the fan blades will actually appear to be rotating counter-clockwise, that is, in the negative direction. In this experiment, the sampling frequency is the frequency with which the strobe flashes.

Ultrasound signals can be transmitted as a "continuous" wave into the human body in a certain direction or as a "pulsed" signal into the specific region of human body. By measuring the frequency difference between the transmitted signal and the received signal, which echoes, for example, off of blood moving through an artery, the velocity of the blood can be estimated.

Doppler ultrasound systems typically include two forms of signal output. A scrolling or sweeping spectrogram image provides visual output, while sound through stereo speakers provides audio output. Doppler ultrasound can determine the presence or absence of flow, the direction and speed of flow, and the character of flow.

In spectral Doppler ultrasound, the Doppler-shifted echoes coming from ultrasound transmitted into the body are received in analog form and are captured by the system's transducer. FIG. 1 shows a Doppler ultrasound system 5 which includes a transducer 11 that transmits an ultrasonic pulse 12 into a reflection zone such as a region including a blood vessel 13, and that receives sound echo signals 14 that are reflected back from the reflection zone. The transducer then converts the sound echoes 14 into an electrical signal.

A beamformer 15 controls the transmit timing of each of the several piezoelectric elements in the transducer 11 and also delays and sums the sound echo signals 14 received by transducer 11. The transmit frequency is determined by a master clock (MC) 10. The summed radio-frequency (RF) signal is then passed to a modulator, such a quadrature modulator, and to a lowpass filter (shown as box 16) to create two "baseband" signals that are conventionally referred to as the in-phase (I) and quadrature (Q) signals or "I/Q" signals 17. These I and Q signals represent the Doppler frequency shift due to blood vessel movement. The I/Q signals then pass through a "range gate" 18.

The output of the range gate is processed for spectral display. This output is also separated into forward and reverse components, which are fed to a pair of stereo speakers 26. In the case of a "continuous" transmit and receive wave (CW), the range gate operation is the same as a constant final sampling process, which introduces an aliasing artifact.

In the case of a "pulsed" transmit and receive wave (PW), the transmit pulse and receive echo are processed during each of a sequence of time intervals—the "pulse repetition interval" (PRI). In other words, a pulse is transmitted and its echo is received during one PRI; these signals are processed as a time "slice;" a new pulse is transmitted and received during the next PRI, and so on. This repetitive operation is the same as constant time sampling process in that it, too, will introduce artifact aliasing. The range gate 18 is used in this case only for range-gating the received echo signal, with no additional sampling. In the discussion below, the term "sampling process" is used to indicate the aspects of either the CW or PW modes of operation that introduce aliasing.

FIG. 2 represents the frequency spectrum of a Doppler I/Q signal before a sampling process; the absolute value of the Fourier transform is on the y-axis and the frequency is on the x-axis. The positive portion of the frequency spectrum is to the right of DC (f=0) and the negative portion is to the left.

FIG. 3 shows the signal of FIG. 2 where the sampling process of the ultrasound system of FIG. 1 has aliased the signal. The resultant aliasing of the signal in FIG. 2 as shown in FIG. 3 is described as follows: Any components in the I/Q input signal 17 with frequencies above half of the sampling frequency are aliased. In FIG. 3, components above $+F_s/2$ have wrapped around to negative frequencies. To the spectral display processor 20b and the audio forward/reverse splitter 21a, these aliased positive frequencies will, without correction, appear negative, with the result that flow towards the transducer will be mapped as flow away from the transducer.

Refer again to FIG. 1. In the case of a spectrogram Image on display 20a received from the display processor 20b, if the spectral image is aliased, the operator viewing a display screen can manually invert and/or shift the spectral display using an adjuster 21, so that the aliased frequencies am displayed correctly. Alternatively, the image can be inverted and/or shifted automatically. In either case, in practice, the preferred scanning mode is to scan with heavy aliasing, even as high as 100%. In such a case, if the reverse flow is not of concern, the baseline can be adjusted to devote the entire range of velocity detection to forward flow. This technique doubles the maximum velocity that can be measured but leaves a very bad, aliased audio signal.

Therefore, it is highly desirable to duplicate the frequency spectrum of FIG. 2 before it is processed for audio output, that is, to provide a signal which is alias-free.

The above discussion provides the manner in which a particular type of ultrasound machine samples a signal. Other sampling configurations are also known. Moreover, this discussion is also intended to cover a sampling process of any type of Doppler processor.

SUMMARY OF THE INVENTION

This invention provides Doppler audio dealiasing by inserting zeros between input samples and then processing the resultant signal in various ways. Accordingly, after the zeros are inserted and a new signal is formed, the newly formed signal is filtered to remove inappropriate parts.

Several embodiments of this invention are described in detail below. All embodiments include inserting a zero-valued signal at chosen points in the sequence of input sample signals. The zero insertion between input samples has the same frequency spectrum as FIG. 3, but the signal sampling rate is effectively increased two times, which is Fs'=2Fs (see FIG. 4). The bandwidth of the forward and reverse channels is doubled so that both channels have the same amount of spectral information.

The difference between the embodiments described below is in the way the desirable components are extracted from increased sample signals and the range of the desirable component is determined based on the input from the adjuster 21, such as spectral inversion and/or shift.

While it is possible to configure this invention in a variety of manners, several particular configurations are discussed in detail below. First, this invention is carried out by providing dealiasing alone. A second configuration including the combination of dealiasing with a forward/reverse split and combined configuration of them, is also described.

The dealiasing-alone embodiments include filters for filtering inappropriate frequency components out of the spectrum to produce the desired frequency spectrum. A complex coefficient lowpass FIR or IfR is used when the embodiment requires a filter with a non-symmetric passband. Another embodiment includes the use of modulators which shift a non-symmetric passband so that it becomes a symmetric passband and thus the filters may have real coefficients. In such a case this invention uses half-band FIRs or IIRs. The output of these dealiasing- alone structure embodiments requires further processing for the forward/reverse split, which thus is a combination of dealiasing with a forward/reverse split.

The embodiment including dealiasing combined with a forward/reverse split includes the use of modulators that shift forward and reverse non-symmetric passbands to become symmetric passband and the use of filters for filtering appropriate frequency components out of the spectrum to produce the forward and reverse spectrum. The filtering is performed by a filter having an alterable frequency cutoff corresponding to a spectral adjustment of a spectral display of the echo.

In the combined embodiment, there is an improved computational efficiency of the total audio processing chain over separate dealiasing-alone and forward/reverse split procedures. Moreover, the embodiments described include time varying coefficients FIRs to improve efficiency. The use of IIRs is also described in that under certain circumstances there are fewer multiplies than for FIRs for the same frequency response.

In implementing this invention, purely digital components can be used or a digital/analog hybrid component configuration can be used.

BRIEF DESCRIPTION OF THE DRAWINGS

FIG. 6b is a graphic representation of zeros inserted into the signal output of FIG. 6a.

FIG. 17a shows the filtered spectrum of the signal of FIG. 16a.

FIG. 18a shows the shifted-back spectrum of the signal of FIG. 17a.

FIG. 19a shows the spectrum component from selecting the real part of FIG. 17a.

DETAILED DESCRIPTION

As is discussed in the summary above, this invention provides Doppler audio dealiasing by inserting zeros between input samples and then processing the result in various ways. After fie zeros are inserted and a new signal is formed, the newly formed signal is filtered to remove inappropriate parts.

Several embodiments of this invention are described in detail below. All embodiments include zero-insertion between pairs of signal values (for example, between pairs of I/Q points), and a filtering operation to get appropriate components from the zero-inserted input stream. The differences between the embodiments described below are in the ways the desirable components are extracted from the increased sampled signal and the range of the desirable component is determined by the input from the adjuster 21.

While it is possible to configure this invention in a variety of manners, several particular configurations are discussed in detail below. In some embodiments, the invention operates by providing dealiasing alone. A combination of dealiasing with a forward/reverse split is also described.

Figure 1:
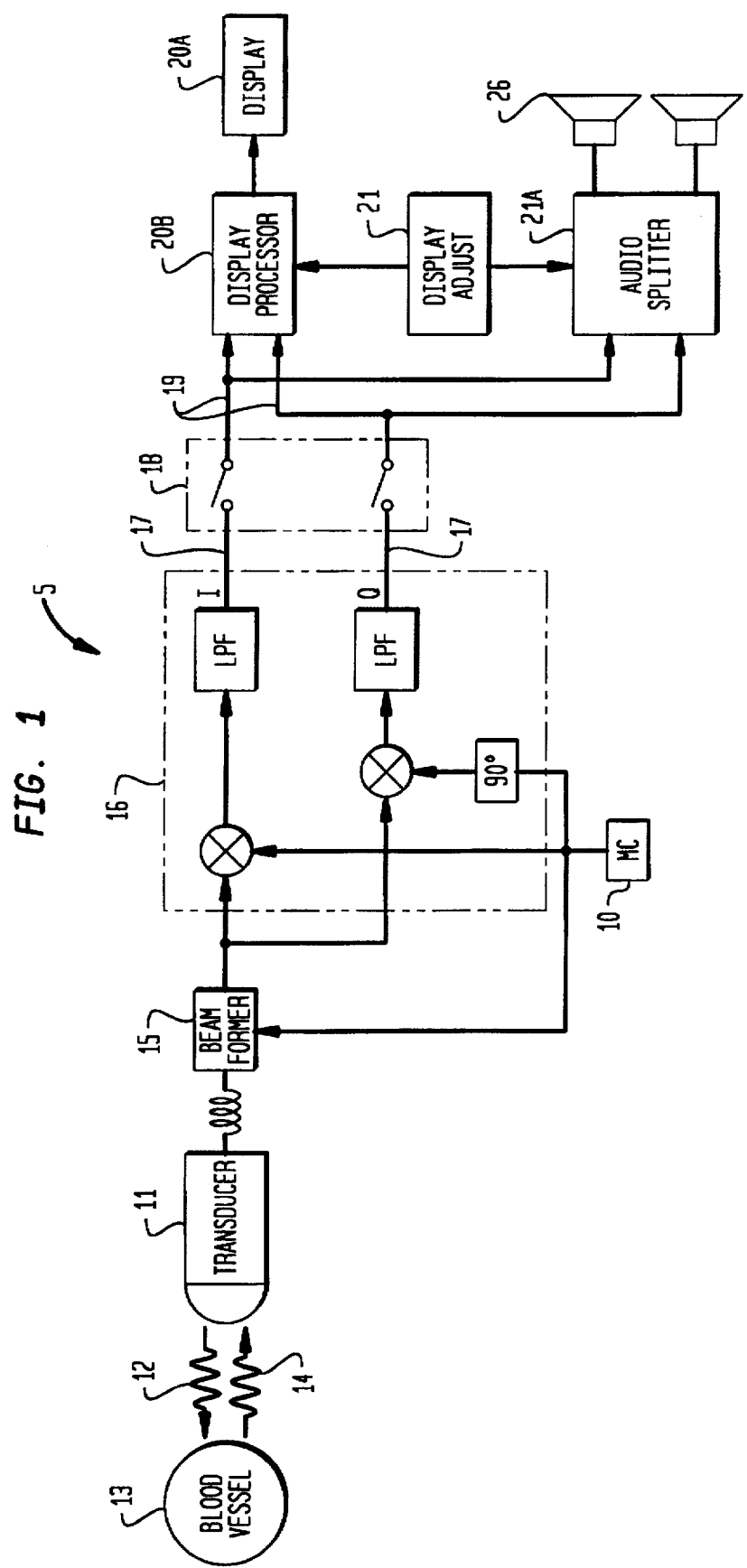
FIG. 1 is a diagram depicting an ultrasound machine that generates a Doppler signal.
Figure 5:
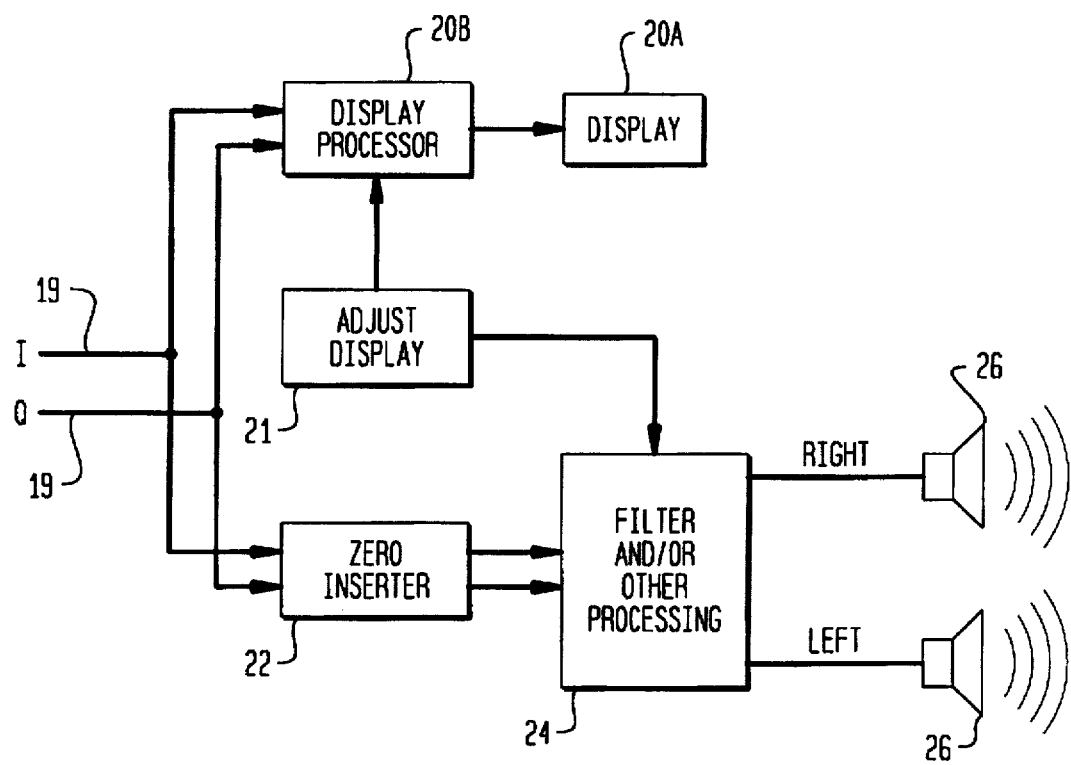
FIG. 5 is a diagram depicting the components of a Doppler ultrasound machine according to the invention that dealiases the audio output.
Figure 6A:
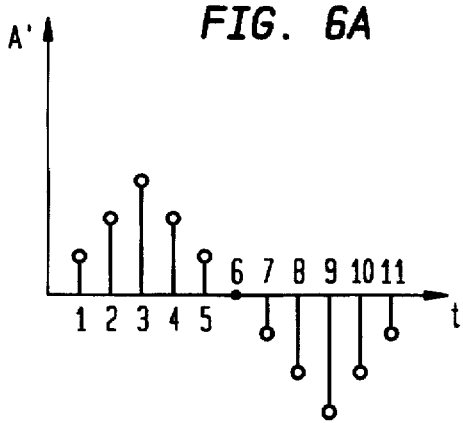
FIG. 6a is a graphic representation the sampled input Doppler signal
Figure 6B:
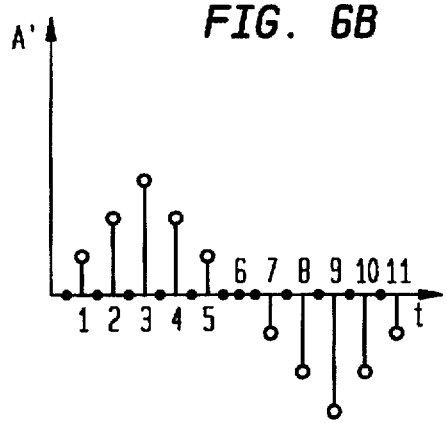

FIGS. 5, 6a and 6b show an arrangement according to the invention for inserting zeros into a stream of input sample signals, and illustrate the effect of the zero-insertion. The aliased signal 19 (see FIG. 1) is processed by a processor 20b for two-dimensional spectral display on a display unit 20a. The display shows images in either gray-scale pixels or color pixels. In one application, the operator of the ultrasound machine will view the spectral display looking at the baseband to see the aliasing. According to his or her judgement, the operator will invert and/or shift the image to eliminate the presence of aliasing in the spectral display output. In a different application, the inversion and/or shift occurs automatically. In either case, the spectrum is adjusted by adjuster 21. The operator or auto-adjust routine provides information to processor 24 about the shift and/or inversion which is then used to dealiase the audio signal as discussed below. In a different case, the adjustment information provided to processor 24 does not require spectral information.

Figure 2:
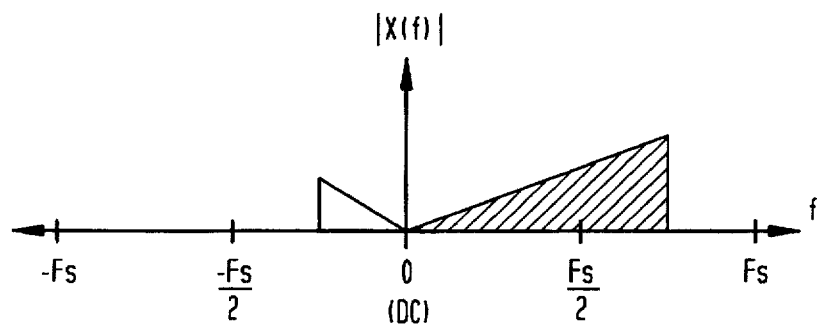
FIG. 2 shows a representational example of a frequency spectrum of a Doppler signal that is the desired signal output.

As discussed above, FIG. 3 depicts a representation of the aliasing wraparound of the signal of FIG. 2 after sampling process. The signal processing of this invention is directed to dealiasing the signal 19 to obtain an output as shown in FIG. 2 within an increased sampling frequency range based on spectral adjustment.

In the embodiments discussed below, that is, where dealiasing alone, or a combination of dealiasing with forward/reverse split, or combined configuration of them is provided, the zero inserter 22 (FIG. 5) inserts zeros between each sample pair and then filter 24 (plus other processing elements) eliminates inappropriate parts of the resultant signal so that the desired signal of FIG. 2 is obtained. This signal processing is discussed in detail below.

To visualize the process of inserting zeros and its result, refer to FIGS. 6a and 6b. FIG. 6a is a graph representing the Doppler signal, with a sampled input domain amplitude A'. FIG. 6b is a graph representing zeros inserted between each input sample. In other words, zero values of A' of the signal are placed between samples 1 and 2, between samples 2 and 3, etc.

Inserting zeros can be done in different manners depending upon whether the signal is analog or digital. In implementing this invention, purely digital components can be used or a digital/analog hybrid component configuration can be used.

In the embodiments discussed, the effect of zero insertion can be demonstrated mathematically. If the input signal is $x(m)$, then the zero-inserter output, $w(n)$, is $$w(n) = \begin{cases} x\left(\dfrac{n}{2}\right) & n = 0, \pm 2, \pm 4, \ldots \\ 0 & \text{elsewhere} \end{cases} \quad \text{(EQ 1)}$$

Note that a consequence of this operation is the doubling of the effective sampling rate.

The zero-inserter 22 output contains two sets of spectrum of its input within the frequency range of increased sampling frequency, which now require filtering to remove the inappropriate portions of the new signal. The benefits of this are explained below.

The frequency domain of the zero-inserter output is obtained using the discrete Fourier transform (although the continuous Fourier transform may also be used with suitable, well-understood adaptations):

$$W(e^{j\omega}) = \sum_{n=-\infty}^{n=\infty} w(n) \cdot e^{-j\omega n} \quad \text{(EQ 2a)}$$

$$= \sum_{n=-\infty}^{n=\infty} x(n/2) \cdot e^{-j\omega n} \quad \text{(EQ 2b)}$$

$$= \sum_{m=-\infty}^{m=\infty} x(m) \cdot e^{-j\omega 2 m} \quad \text{(EQ 2c)}$$

$$= X(e^{-j2\omega}) \quad \text{(EQ 2d)}$$

where $\omega$=is the frequency of interest, W and X are the Fourier transforms of w and x, respectively, and $m=n/2$.

Figure 4:
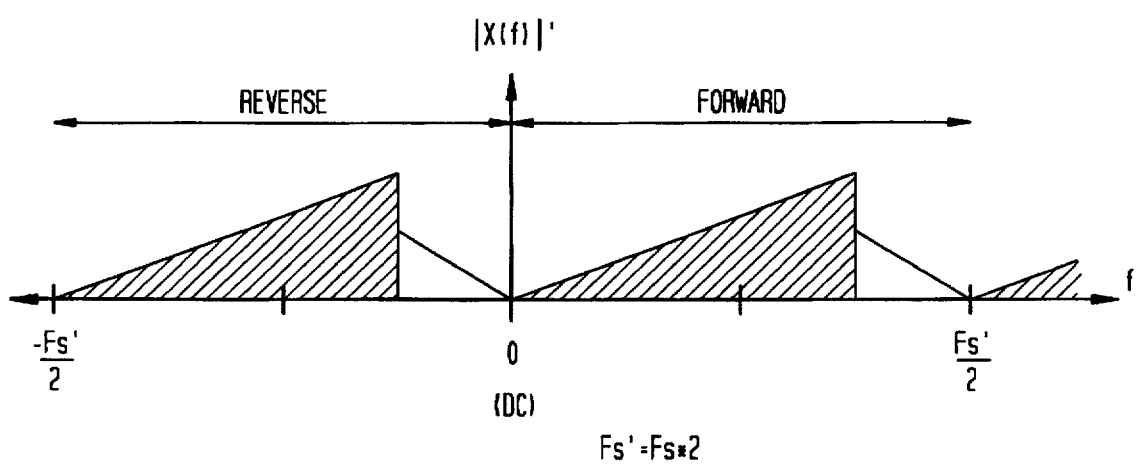
FIG. 4 shows a representation of a frequency spectrum of a Doppler signal of FIG. 3 after zero insertion.

Since $X(e^{-j\omega})$ is sampled twice around the unit circle, the spectrum repeats, or has "images" centered at $F_s'$, as shown in FIG. 4. The dealiased signal can be obtained by using a filter to remove the inappropriate parts of the spectrum.

FIG. 5 shows an embodiment of the dealiasing-alone structure of this invention where the aliased input 19 is processed by a zero inserter 22. Accordingly, the result of inserting zeros is that the aliased signal is changed from that shown in FIG. 3 and FIG. 6a to that shown in FIG. 4 and FIG. 6b.

In both the dealiasing-alone configuration and the combined or combination configuration with the forward/reverse split, the filter used in accordance with this invention depends upon the filter cutoffs required to retrieve the signal.

Figure 8:
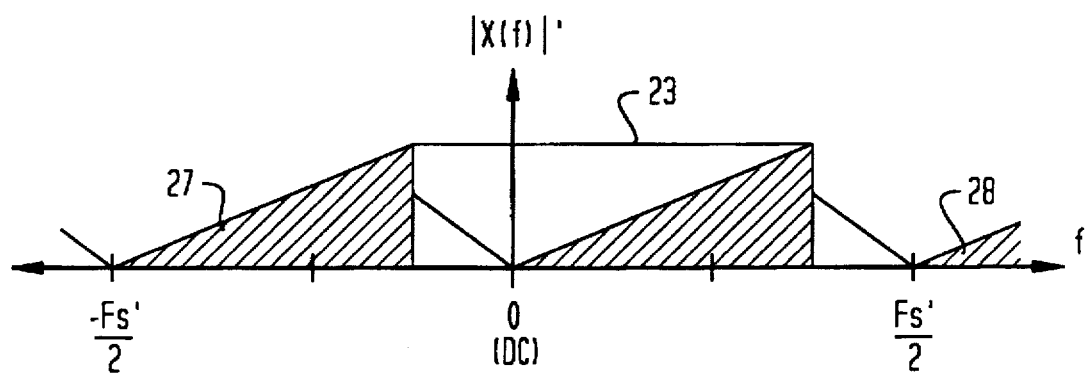
FIG. 8 shows the passband of a complex LPF superimposed on the spectrum of zero-inserted input.
Figure 10:
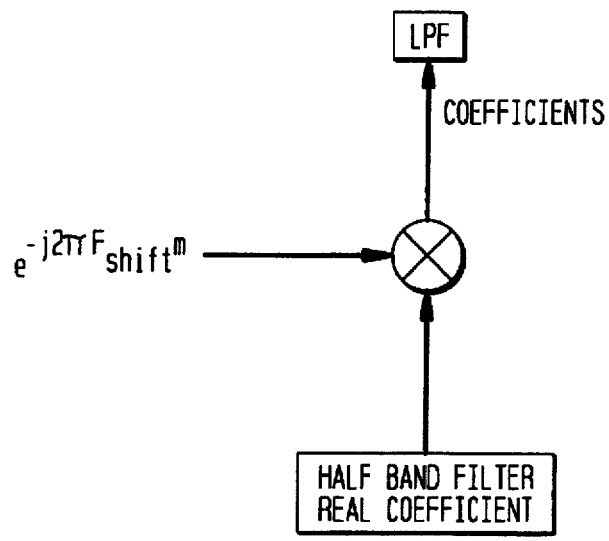
FIG. 10 is a diagram depicting complex coefficients generating a sequence by multiplying the complex value by the real coefficient of the half-band filter.

For example, the lowpass filter in FIG. 8 is not symmetric about DC and therefore must have complex coefficients. These complex coefficients, for example, can be derived from real coefficients of the half-band filter multiplied by the complex value (FIG. 10), which is correlated to the spectral display adjustment by adjuster 20b. The complex value is $\exp(-j2TL \cdot F_{shift} \cdot n)$, where $F_{shift}$ is;

$$F_{shift} = 1/2 \cdot \left[ 1/2 - \frac{(\text{shift level})}{(\text{number of shift level})} \right], \text{invert-off;} \quad \text{(EQ 3a)}$$

$$= 1/2 \cdot \left[ \frac{(\text{shift level})}{(\text{number of shift level})} - \frac{1}{2} \right], \text{invert-on;} \quad \text{(EQ 3b)}$$

$$-\frac{M}{2} \leq \text{shift level} \leq \frac{M}{2} \quad \text{(EQ 3c)}$$

where M is the number of shift levels.

Other deriving methods are known and may also be used.

Figure 3:
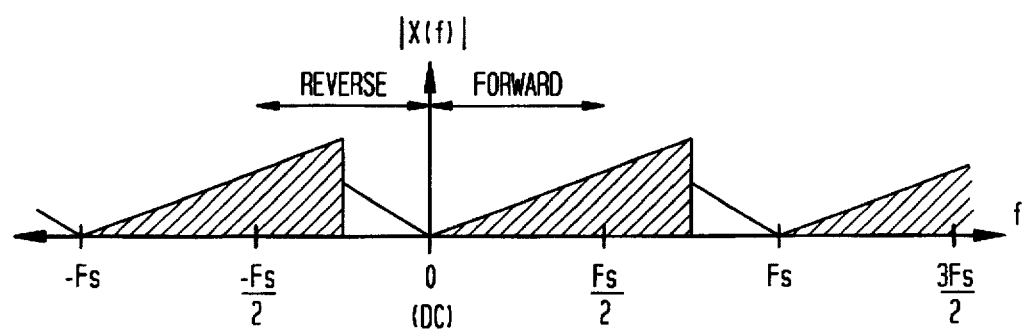
FIG. 3 shows a representation of the aliasing wraparound of the signal of FIG. 2 due to a sampling process.
Figure 7:
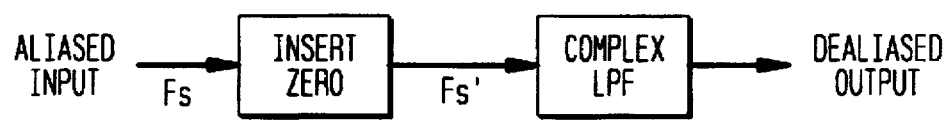
FIG. 7 shows a dealiasing structure according to the invention.
Figure 9:
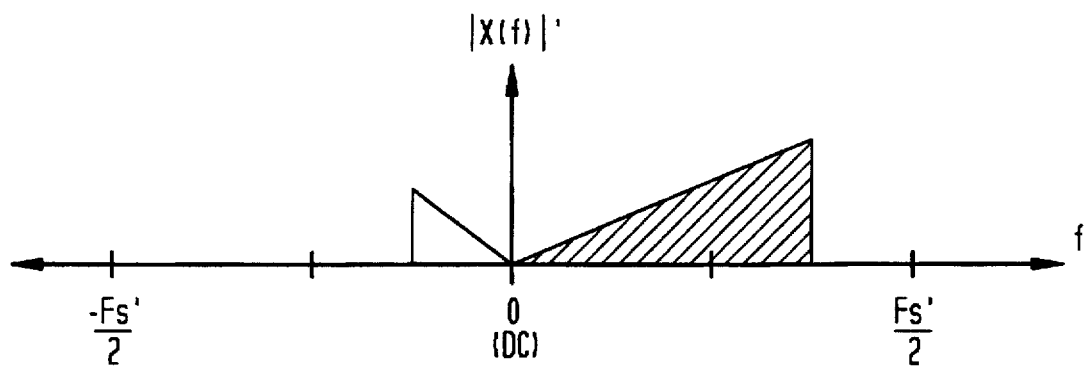
FIG. 9 shows a frequency spectrum of a complex lowpass filtered of the signal of FIG. 8.

Thus, the system configuration of FIG. 7 operating on a signal as shown in FIG. 3 includes a complex lowpass filter, LPF 25, to retrieve the signal as shown in FIG. 9 based on the input from the adjuster 20b. The recovered portion of the spectrum, which is the complex LPF's output, is designated by lowpass filter (LPF) region 23 in FIG. 8. Thus, the inappropriate portions 27 and 28 are removed from the spectrum, leaving passband 23 (see FIG. 9), which is the same as the signal shown in FIG. 2 within the increased sampling frequency range ($\pm F_s'/2$).

As is mentioned above, the filter used in accordance with this invention depends upon the filter cutoffs required to retrieve the signal. For different implementations, different types of filters having different filter cutoffs are used, such as complex lowpass FIR or IIR filters, half-band or time-varying real or complex coefficient FIR or IIR filters. These filter cutoffs are correlated to the spectral display adjustment shift caused by adjuster 20b (see FIGS. 1 and 5).

In the dealiasing-alone configuration shown FIG. 5, where this invention uses a complex LPF 25, it is also desirable to implement processing time-saving methods and devices, particularly since, by inserting zeros, the sampling rate increases or doubles. Therefore filtering is required at a high computational expense. Computational efficiency can be improved by using a time-varying coefficient, multirate LPF for dealiasing, with or without a modulator. In such a case, only performing the convolution multiply/add for inputs which are non-zero avoids redundant calculations. The benefit of using such a filter can be shown mathematically, where if the N-point lowpass filter impulse response is h(n), then the convolution sum is:

$$y(n) = \sum_{k=0}^{n-1} h(n-k) \cdot w(k) \quad \text{(EQ 4)}$$

Since every other filter input is zero, EQ. 4 can be decomposed into even and odd terms as follows:

$$y(n) = \begin{cases} \sum_{k=0}^{\frac{N}{2}-1} h(n-2k) \cdot x(k) & n \text{ even} \\ \sum_{k=0}^{\frac{N}{2}-1} h(n-2k-1) \cdot x(k) & n \text{ odd} \end{cases} \quad \text{(EQ 5)}$$

When the filter is implemented with EQ. 5 instead of EQ. 4, the number of multiply/adds is reduced by a factor of two.

Figure 11:
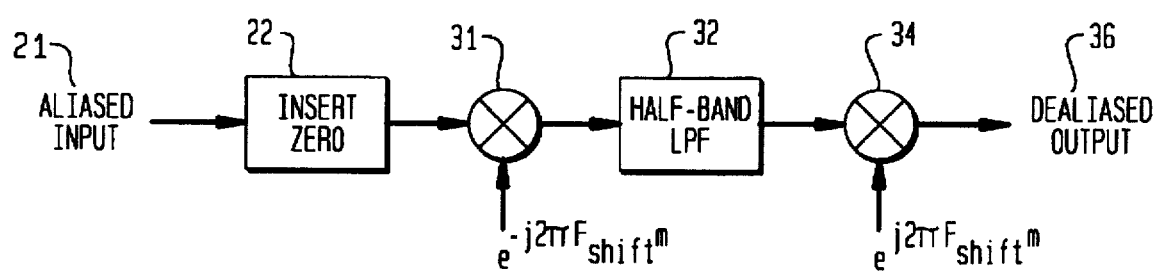
FIG. 11 depicts a dealiasing structure employing half-band filters.
Figure 12A:
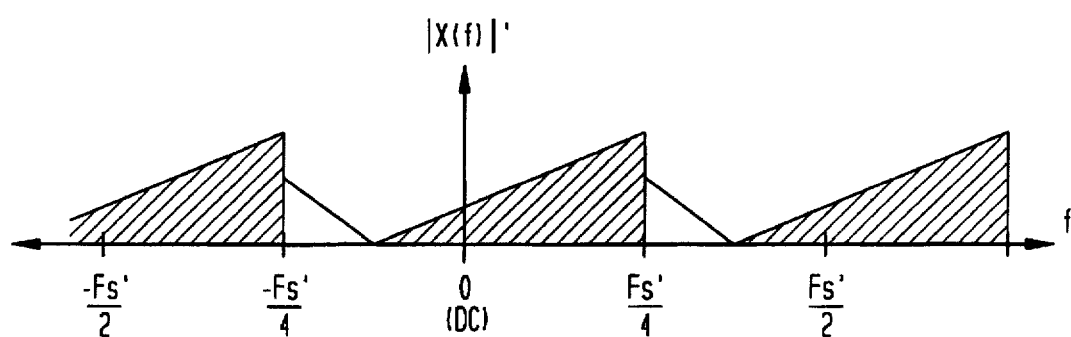
FIG. 12a shows the frequency spectrum of the zero-inserted input modulated by complex modulator.

In a different dealiasing-alone embodiment, complex coefficients are not present. Rather than shift the LPF frequency response, the zero-inserted input signal is shifted based on the input from adjuster 20b with a complex cosine or sine modulator 31 (FIG. 11) so that it is centered around DC (see FIG. 12a) to allow the use of an LPF with a symmetric passband.

Figure 12B:
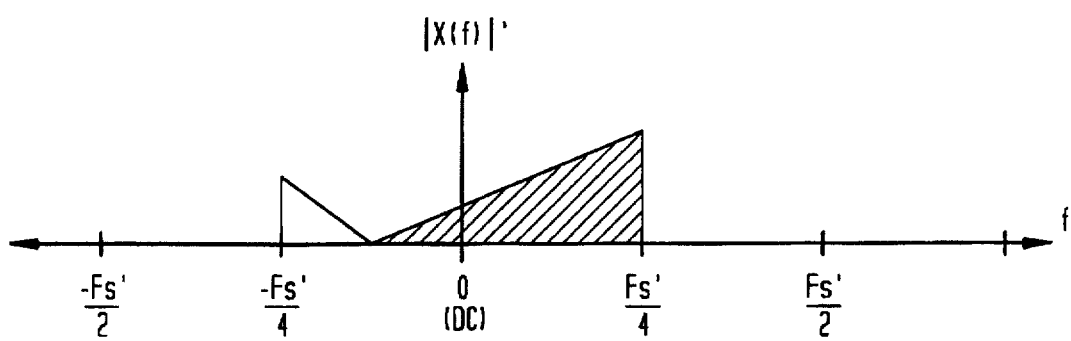
FIG. 12b shows the lowpass filtered signal of FIG. 10a modulated to its proper position.
Figure 12C:
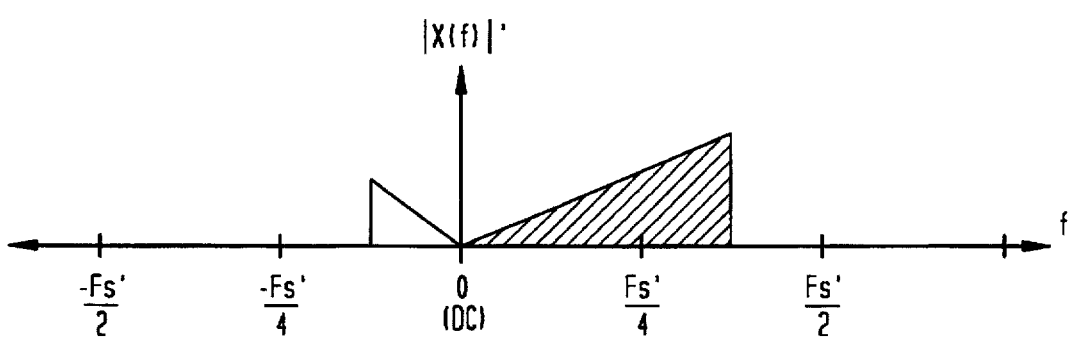
FIG. 12c shows the frequency spectrum of the signal modulated again from the signal of FIG. 12b.

The passband of the lowpass filter discussed above is equal to half the post-zero-insertion sample rate. For half-band FIR filters with an odd number of coefficients, every other coefficient (except for the center one) is zero, and therefore, the number of filter multiply/adds can be reduced by approximately another factor of two. If the half-band filter 32 is IIR, known methods may be used to efficiently reduce the number of poles and zeros for same frequency response. Moreover, after the signal is filtered (see FIG. 12b) it is again modulated by modulator 34, thus obtaining the desired spectrum (see FIG. 12c).

Above, mainly the dealiasing-alone embodiment of this invention is discussed.

In clinical practice, the Doppler audio signal is preferably separated into forward and reverse channels which am then output to left and right speakers, or right and left speakers when spectrum inversion is selected. Beneficially, the process of separating the signal into forward and reverse channels can be connected to the filtering process necessary for audio dealiasing.

Figure 13A:
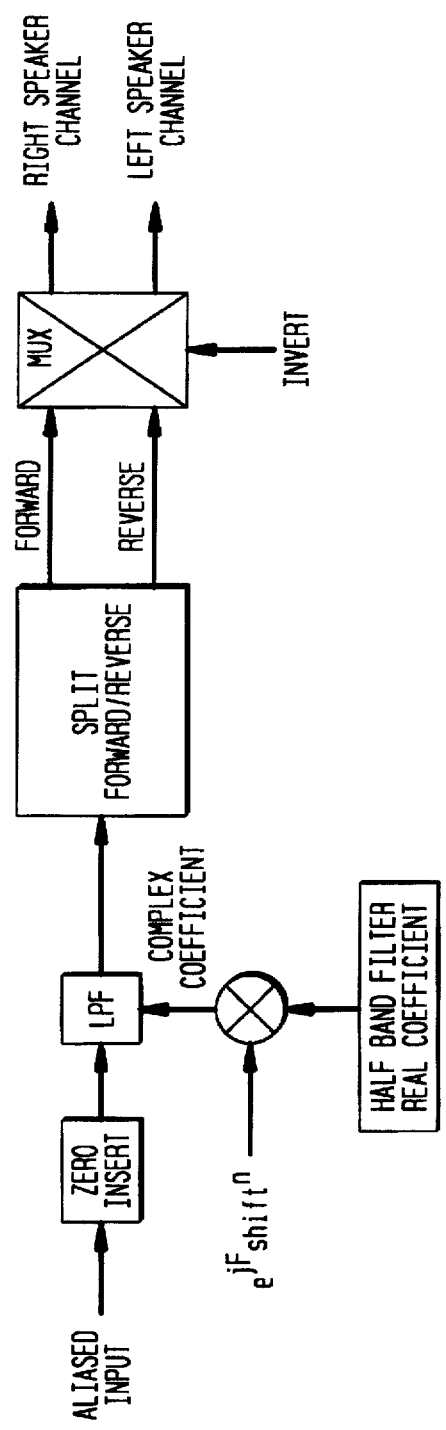
FIG. 13a shows an embodiment of a separating signal of this invention where a forward/reverse splitter is connected to the complex LPF type filtering process.
Figure 13B:
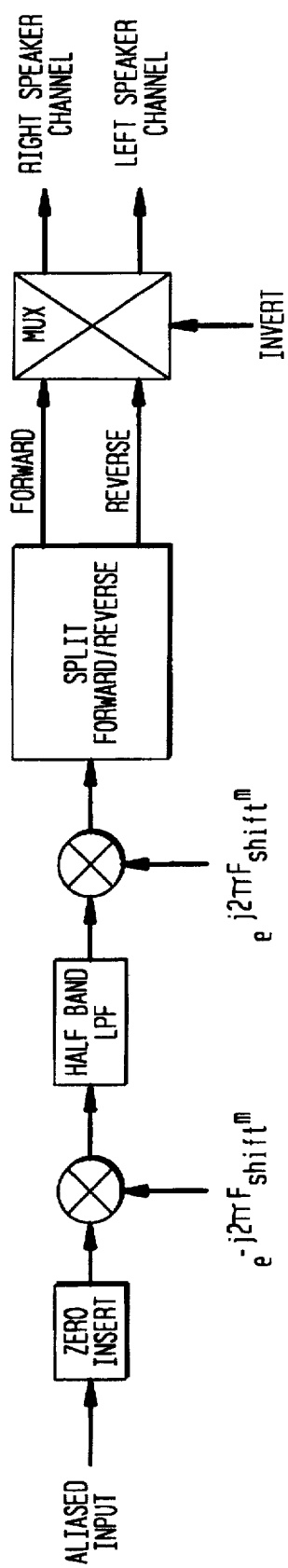
FIG. 13b shows an embodiment of the separating signal of this invention where the forward/reverse splitter is connected to a modular type filtering process.
Figure 14:
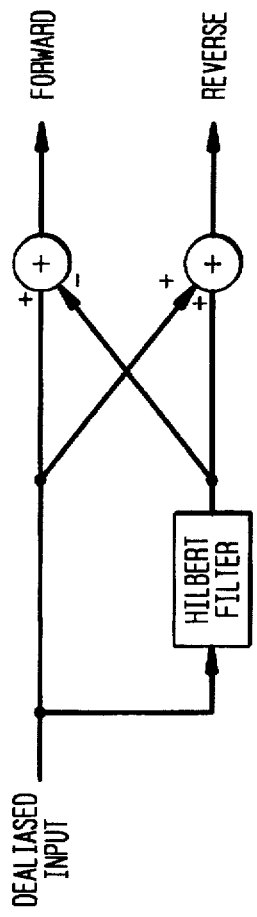
FIG. 14 shows the typical embodiment of a forward/reverse splitter. (Hilbert Method) commonly used in Doppler ultrasound system.

FIG. 13a and FIG. 13b show two embodiments of the process of separating the signal into forward an reverse channels. By comparison, the typical embodiment of a splitter (using the known Hilbert method) is shown in FIG. 14, which is commonly used in Doppler ultrasound systems.

In one embodiment of the invention, the forward and reverse separation operation is combined with the above-mentioned procedure using dealiasing alone. While it is possible to configured this invention in a variety of manners, a particular configuration is discussed in detail below (see FIG. 15).

Figure 15:
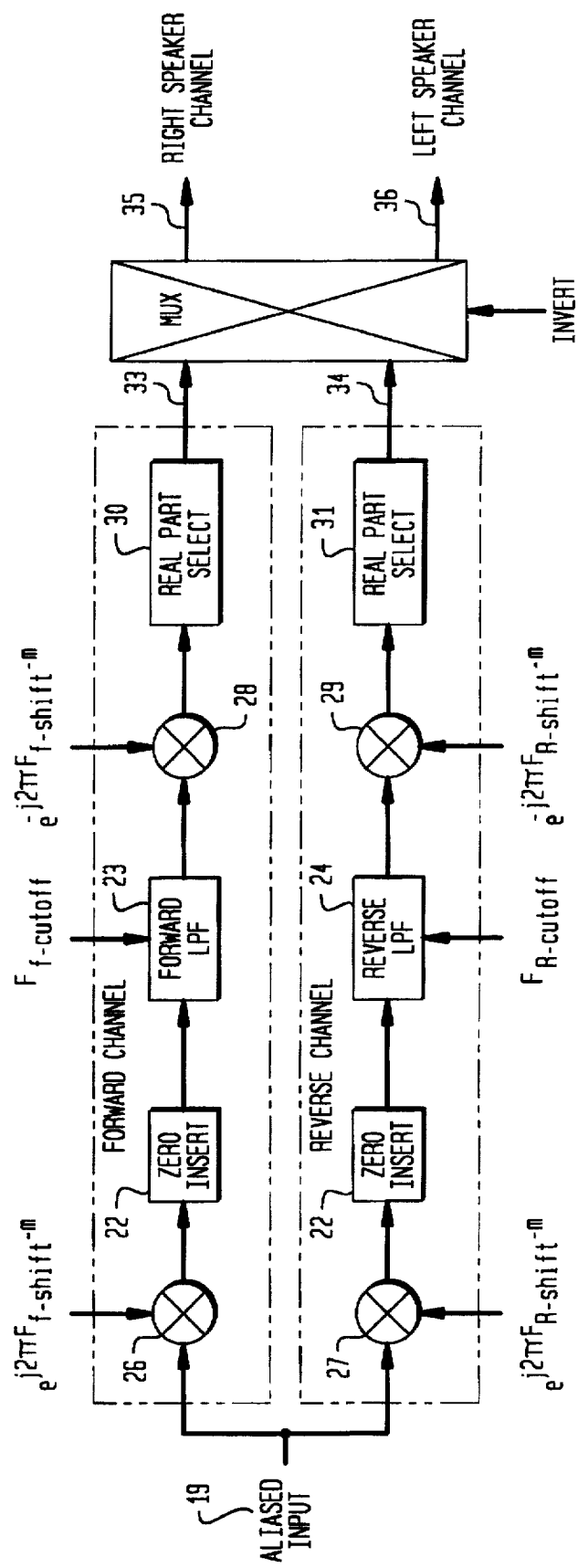
FIG. 15 shows an embodiment of the invention where the forward and reverse split scheme and input signal modulation-type dealiasing scheme are combined together.

In FIG. 15, the relationship is shown between the inversion 32 and/or shift in the spectral display image as provided by spectral display processor 20b and adjuster 21. The cutoff frequency of the forward and reverse LPFs is changed based on the input from the adjuster 21. In this embodiment, the first modulations (using modulators 26 and 27) are performed prior to zero-insertion to improve the computational efficiencies.

Figure 16A:
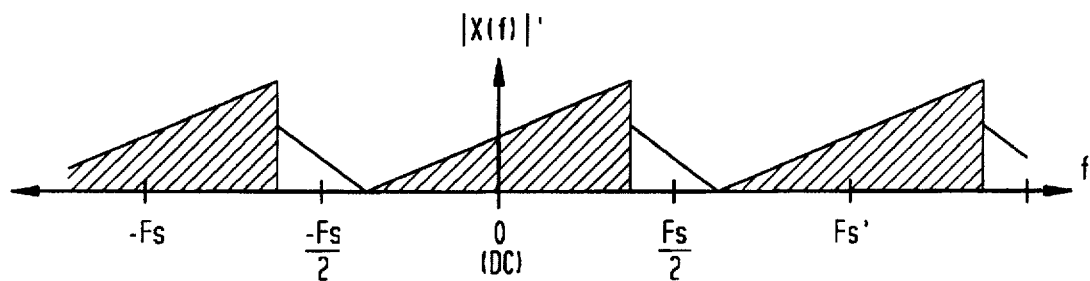
FIG. 16a shows the forward channel spectrum of the signal generated by the modulator.
Figure 16B:
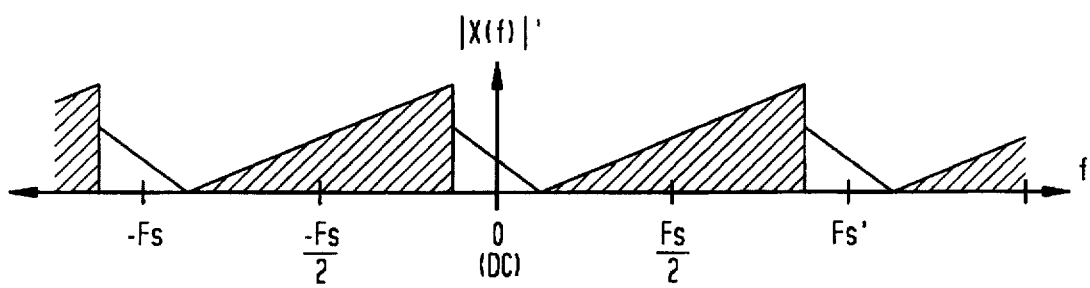
FIG. 16b shows the reverse channel spectrum of the signal generated by the modulator.
Figure 17A:
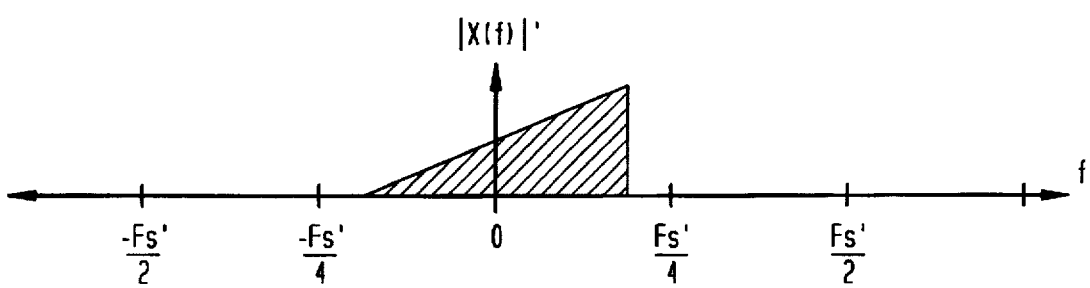
Figure 17B:
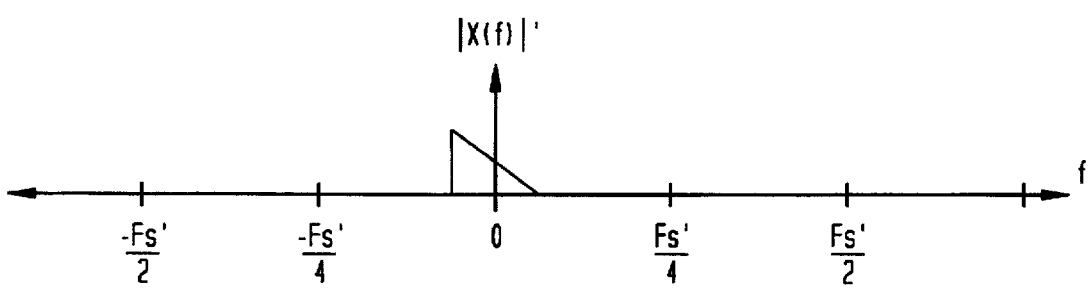
FIG. 17b shows the filtered spectrum of the signal of FIG. 16b.

The aliased signal 19 is first shifted by modulators 26, 27 to center the forward and reverse portion of the spectrum about DC. In other words, the negative portion of the signal spectrum is shifted upward in frequency and the positive portion of the signal spectrum is shifted downward in frequency. FIGS. 16a and 16b show the forward and reverse channel spectra of the aliased signal generated by modulators 26, 27.

The amount of forward $F_{F\text{-}shift}$ and reverse ($F_{R\text{-}shift}$) shift can be described as follows, for example:

(EQ 6a):

$$F_{F\text{-}shift} = 1/2 \cdot \left[ 1/2 - \frac{(\text{shift level})}{(\text{number of shift level})} \right], \text{inverse-off;}$$

$$= 1/2 \cdot \left[ \frac{(\text{shift level})}{(\text{number of shift level})} - \frac{1}{2} \right], \text{inverse-off;}$$

(EQ 6b):

$$F_{R\text{-}shift} = 1/2 \cdot \left[ \frac{(\text{shift level})}{(\text{number of shift level})} - \frac{1}{2} \right], \text{inverse-off;}$$

$$= 1/2 \cdot \left[ \frac{1}{2} - \frac{(\text{shift level})}{(\text{number of shift level})} \right], \text{inverse-on;}$$

(EQ 6c):

$$-\frac{M}{2} \leq \text{shift level} \leq \frac{M}{2}$$

where M=Number of shift levels.

Zero insertor 22 inserts zeroes into the output of the modulators. The signals are then operated upon the real coefficients LPFs 23, 24. The cutoff frequencies of each LPF are set based on the input from the adjuster 21 as follows, for example:

$$F_{f\text{-}cutoff} = F_{F\text{-}shift} \quad \text{(EQ 7a)}$$

$$F_{R\text{-}cutoff} = F_{R\text{-}shift} \quad \text{(EQ 7b)}$$

where $F_{f\text{-}cutoff} = F_{R\text{-}shift}$ and $F_{R\text{-}cutoff}$ are normalized cutoff frequencies.

The several different types of filters, such as FIR and IIR, are used and the spectrum component of the filtered signal are shown in FIG. 15a and FIG. 15b.

Figure 18A:
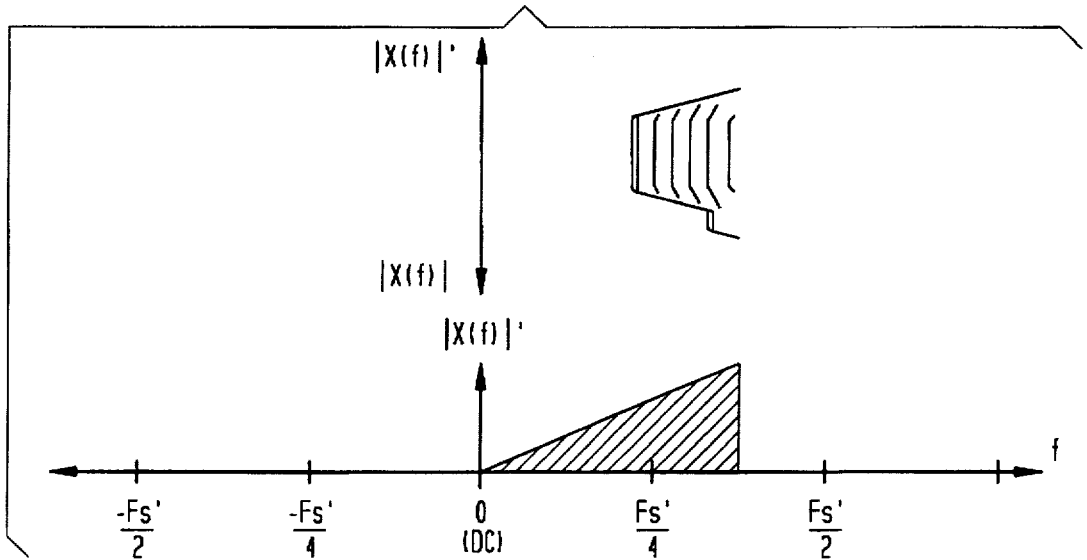
Figure 18B:
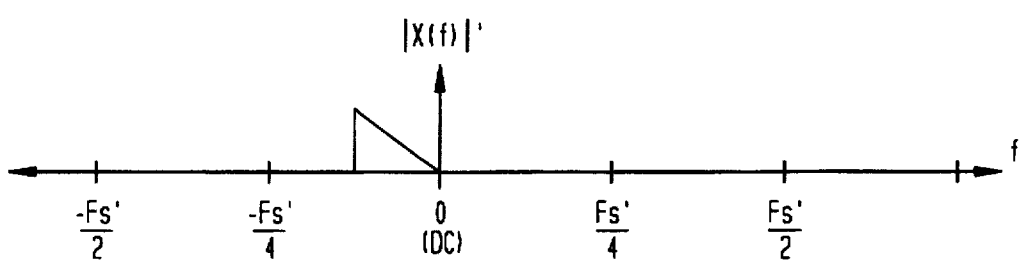
FIG. 18b shows the shifted-back spectrum of the signal of FIG. 17b.

The filtered output signals are then shifted back to their proper frequencies by modulators 28 and 29. FIG. 18a and FIG. 18b show shifted back components of the filtered output signals.

Figure 19A:
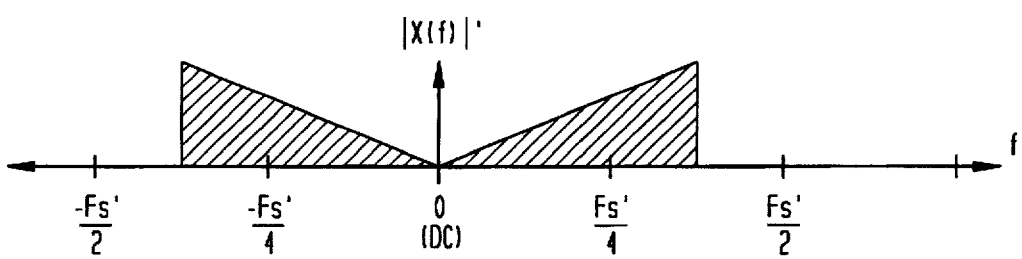
Figure 19B:
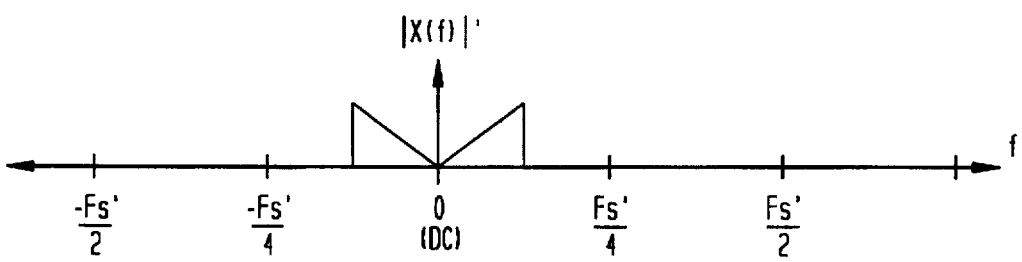
FIG. 19b shows the spectrum component from selecting the real part of FIG. 17b.

Selecting the real part of the shifted-back forward and reverse complex signals, 30 and 31, yields the dealiased forward and reverse output, 33 and 34, respectively. The spectral components of these signals are illustrated in FIG. 19a and FIG. 19b.

Figure 20A:
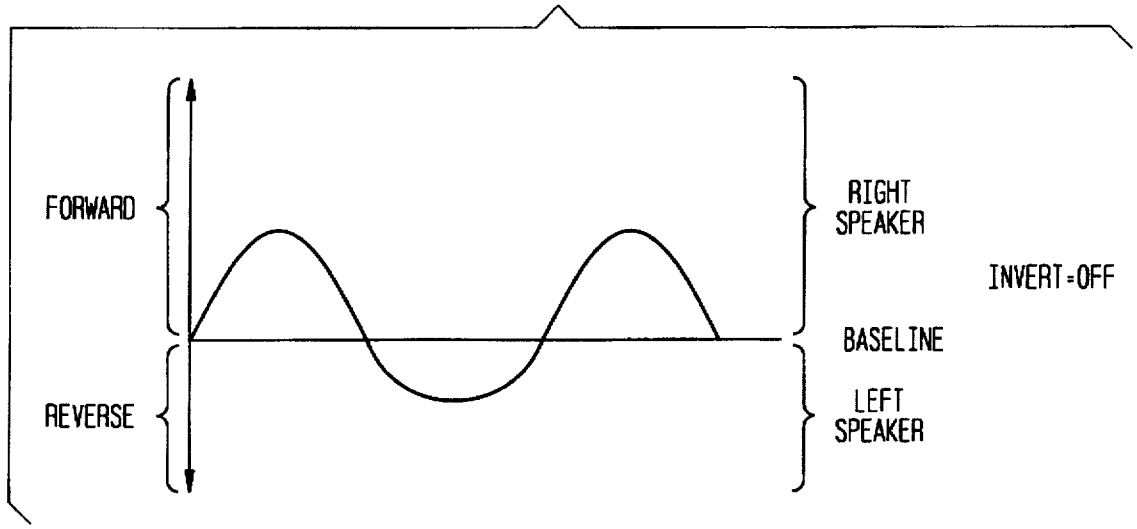
FIG. 20a shows the relationship between forward/reverse signals and right/left speaker channels with inversion.
Figure 20B:
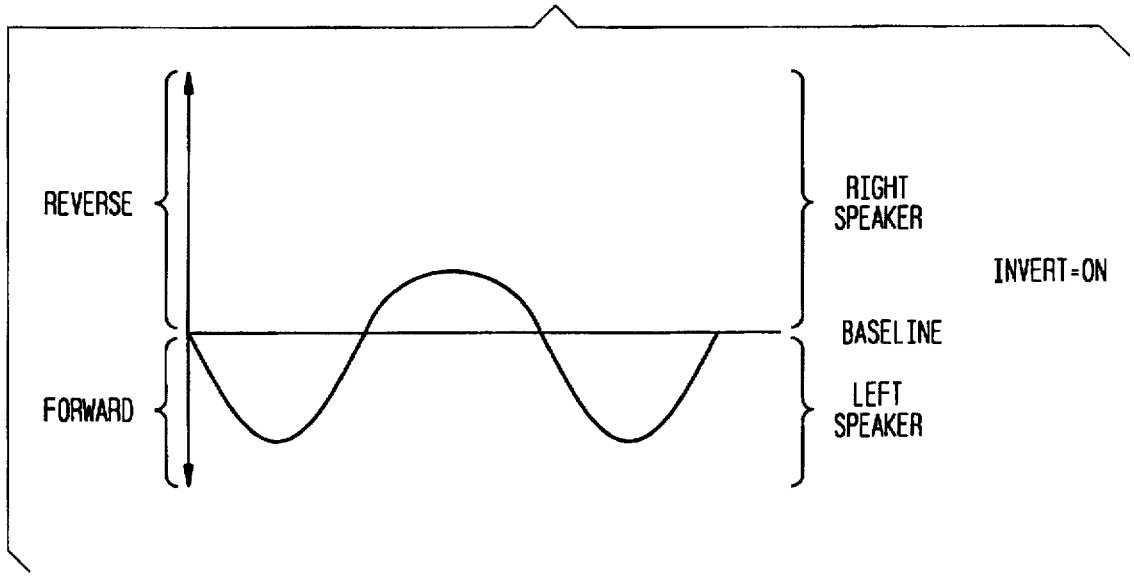
FIG. 20b shows the relationship between forward/reverse signals and right/left speaker channels with inversion off.

The forward and reverse outputs 33 and 34 are then multiplexed by a multiplexer 32, based on the inverse input from the adjuster 20b, to generated right and left speaker channel audio signals 35, 36. When inversion is off, the forward output is passed to the right speaker channel and the reverse output is passed to left speaker channel. When inversion is on, the forward output is passed to the left speaker channel and the reverse output is passed to the right speaker channel. FIGS. 20a and 20b are representatives of each case. In this way, the spectrum components above baseline are always passed to the right speaker and the spectrum components below baseline are passed to the left speaker, regardless of forward or reverse signal. In other embodiments, this multiplexer function can be combined with the modulator and filtering operation as well.

The computational efficiency of this invention can be improved by increasing the efficiency of the LPF.

An IIR filter with a numerator order N-1 and a denominator order D-1 can be expressed with the transfer function:

$$H(z) = \frac{\sum_{r=0}^{N-1} b_r \cdot z^{-r}}{1 - \sum_{r=1}^{D-1} a_r \cdot z^{-r}} = \frac{N(z)}{D(z)} \quad \text{(EQ 8)}$$

where $a_r$ and $b_r$ are the real coefficients of the denominator and numerator, respectively, of the transfer function, which can be chosen using known filter design routines.

Figure 21:
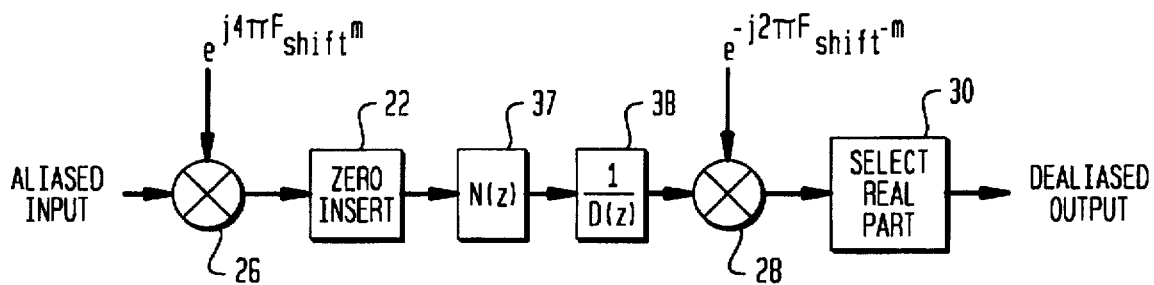
FIG. 21 shows a structure where the numerator and denominator of the IIR filter are cascaded.

Because multiplication in the z-domain is equivalent to convolution in the time domain, the transfer function H(z) can be implemented with two cascaded filters. FIG. 21 shows a forward signal channel where the numerator 37 and denominator 38 of the IIR filter are cascaded. Thus, the numerator filter is FIR and, therefore, multiplication by zero can be avoided with the use of a time-varying coefficient structure. Effectively, this moves the numerator to the low sample rate side of the structure, that is, before zero-insertion in the signal path. Alternatively, the denominator can be moved to the low sample rate side.

Figure 22:
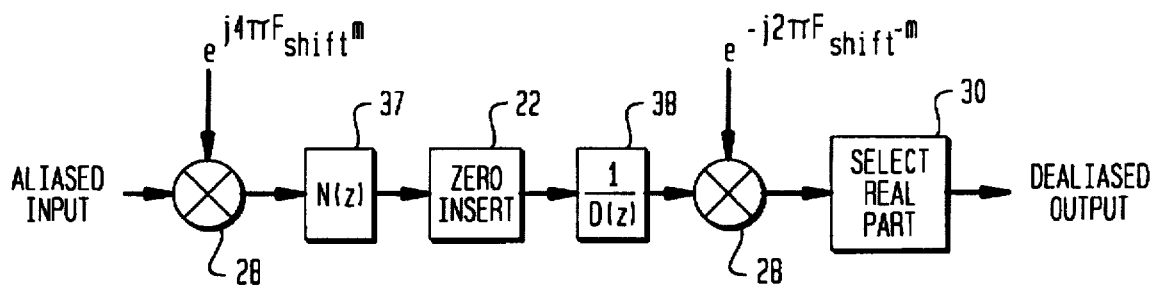
FIG. 22 shows a structure where the numerator of the IIR is positioned before the zero inserter.

FIG. 22 shows the numerator 37 at the low sample rate side of the structure. By modifying Eq. 8 so that the numerator filter state variables are only computed and stored at the pre-zero insertion rate, the system is computationally less expensive. That is, since half of the numerator FIR inputs are zeroes, only half of its coefficients must be applied during an output computation, i.e. it can be implemented with an efficient, time-varying-coefficient structure as in Eq. 5.

Figure 23:
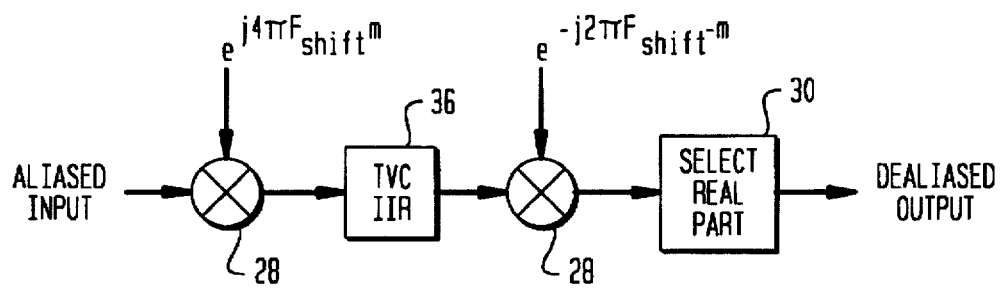
FIG. 23 shows a structure utilizing a time-varying coefficient IIR filter.

FIG. 23 shows the entire dealiaser when implemented with the multirate, time-varying-coefficient (TVC) IIR 36. Advantageously, the number of multiplications and additions required for the combined dealiasing structures of FIGS. 21, 22 and 23 (when N(z) is implemented with time-varying coefficients) is approximately three-fourths of that required for the straight-forward implementation of FIG. 15.

In summary, by inserting zeros into the sampled signal and modulating the sampled input signal or shifting filter frequency response, dealiasing and right/left speaker audio split can be effected by the structures shown in the figures as well as others designed for computational efficiency and cost effectiveness. The structures and methods described above provide a reliable manner in which to dealiase an audio signal generated in a Doppler ultrasound system based on adjuster 20b.

Either the dealiasing-alone or the combined dealiasing and forward/reverse split embodiments of the invention can be implemented as digital/analog hybrids. In such case, conventional digital-to-analog converters will be included in the signal path before any analog components.

We claim:

1. A method for use in a Doppler ultrasound system including a transducer which transmits and receives ultrasound signals, said transducer generating an ultrasound signal and receiving an echo of said signal, wherein said echo is sampled by a sampling process to generate a stream of aliased input sample signals, wherein the combination of each of said input sample signals with the next sampled signal in said stream is an input sample pair, said method comprising the steps of:

inserting a zero value sample between each of said input sample pairs to form a new signal stream which includes both appropriate parts and inappropriate parts; and filtering said new signal stream to remove said inappropriate parts to provide a dealiased output signal.

2. A method as recited in claim 1 wherein, prior to carrying out said zero-inserting step, the method further comprises the step of modulating the input stream.

3. A method as recited in claim 1 wherein, after carrying out said zero-inserting step, the method further comprises the step of modulating the new signal stream.

4. A method as recited in claim 1 wherein said filtering step is performed by a after selected from a group of filters including real and complex digital finite impulse response filters, real and complex infinite response filters, and real and complex analog filters.

5. A method as recited in claim 1 wherein said signal contains forward components and reverse components and wherein said method further comprises the step of separating said forward components from said reverse components to generate new signals representing said forward components and said reverse components.

6. A Doppler ultrasound system including a transducer for transmitting an ultrasound signal and for receiving an echo of said ultrasound signal, wherein said system further includes a sampling process for converting said echo into a stream of input sample signals, wherein the combination of each of said input sample signals in said stream with the next sampled signal in said stream is an input sample pair, said system comprising:

- a zero inserter component which inserts a zero-value sample between each of input sample pairs to form a new signal stream including both appropriate parts and inappropriate parts; and
- a filter component which removes said inappropriate parts from said new signal stream to provide an output signal.

7. A system as recited in claim 6 further comprising a modulator for modulating said input stream.

8. A system as recited in claim 6 further comprising a modulator for modulating said new stream of signals.

9. A system as recited in claim 6 wherein said filter component is selected from a group of fitters including digital finite impulse response filters and infinite response filters and analog filters.

10. A system as recited in claim 6 wherein said signal contains forward components and reverse components and wherein said system further comprises a stereo component which separates said forward components from said reverse components to generate new signals representing said forward components and said reverse components.

* * * * *